United States Patent
Drennen et al.

(10) Patent No.: US 7,464,151 B1
(45) Date of Patent: Dec. 9, 2008

(54) NETWORK CENTRIC APPLICATION FAILOVER ARCHITECTURE

(75) Inventors: William E. Drennen, Belton, MO (US); Richard D. McLeod, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 458 days.

(21) Appl. No.: 11/339,191

(22) Filed: Jan. 25, 2006

(51) Int. Cl.
*G06F 15/16* (2006.01)

(52) U.S. Cl. ...................................... 709/223; 709/225

(58) Field of Classification Search ......... 709/200–203, 709/217–227
See application file for complete search history.

(56) References Cited

U.S. PATENT DOCUMENTS

| | | | | |
|---|---|---|---|---|
| 5,951,650 | A * | 9/1999 | Bell et al. | 709/238 |
| 6,430,622 | B1 * | 8/2002 | Aiken et al. | 709/245 |
| 6,954,794 | B2 * | 10/2005 | Rudd et al. | 709/230 |
| 6,963,917 | B1 * | 11/2005 | Callis et al. | 709/227 |
| 7,120,697 | B2 * | 10/2006 | Aiken et al. | 709/229 |
| 7,254,626 | B1 * | 8/2007 | Kommula et al. | 709/223 |
| 7,257,817 | B2 * | 8/2007 | Cabrera et al. | 719/310 |
| 2005/0267920 | A1 * | 12/2005 | Helliker et al. | 707/204 |

OTHER PUBLICATIONS

Drennen, William E., et al., "Dynamic Server Addition Using Virtual Routing," filed Jan. 25, 2006, U.S. Appl. No. 11/339,190, Specification (29 pgs.) and Drawings (9 sheets).

* cited by examiner

*Primary Examiner*—Moustafa M Meky

(57) ABSTRACT

A high availability data store system is provided. The system includes data centers, each data center including a data store, host computers, and application instances executing on the host computers. Each host computer routes client requests to the application instances executing on that host computer based on an internet protocol address. The system further includes a load balancer that establishes a session with a client, the session associating a first application instance with an internet protocol address. The load balancer sends the client requests to the first application instance using the first internet protocol address. The system also includes a name service, the name service operable, when the data center fails, to change the session to associate to a second internet protocol address that routes to a second application instance executing on a host computer in one of the operable data centers.

20 Claims, 8 Drawing Sheets

US 7,464,151 B1

NETWORK CENTRIC APPLICATION FAILOVER ARCHITECTURE

CROSS-REFERENCE TO RELATED APPLICATIONS

This application includes subject matter related to U.S. patent application Ser. No. 11/339,190, filed Jan. 25, 2006 and entitled "Dynamic Server Addition Using Virtual Routing," by William Drennan, et al, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer systems, and more particularly, but not by way of limitation, to an application failover architecture.

BACKGROUND OF THE INVENTION

Communication among host computers via the Internet may employ the internet protocol (IP) for routing data packets from a first computer to a second computer. The communication may comprise a service request from a client application running or executing on the first computer directed to a server application executing on the second computer, for example. The packets are routed from the first computer through the Internet to the second computer by routers based on an IP address of the second computer contained in the packets. The routers are computers executing a routing program or application that the router uses to determine where to send received packets. The routing is typically based on routing tables that define preferred routes associated with specific IP addresses. Typically, the last router involved in routing a packet determines that the second computer addressed by the IP address of the routed packet is located on a subnet linked to the last router. The last router determines the media access control (MAC) address of the second computer, for example by executing an address resolution protocol (ARP) request. The last router then strips off an IP header from the packet and sends the data component of the packet onto the local area network (LAN) addressed with the MAC address of the second computer, for example an Ethernet address. The first computer may not know the IP address of the second computer and may look up the IP address based on a known name of the second computer, for example using a domain name service (DNS).

SUMMARY OF THE INVENTION

According to one embodiment, a high availability data store system is provided. The system includes data centers, each data center comprising a data store, host computers, and application instances executing on the host computers. Each host computer routes client requests to the application instances executing on that host computer based on an internet protocol address. The system further includes a load balancer that establishes a session with a client, the session associating a first application instance with an internet protocol address. The load balancer sends the client requests to the first application instance using the first internet protocol address. The system also includes a name service, the name service operable, when the data center fails, to change the session to associate to a second internet protocol address that routes to a second application instance executing on a host computer in one of the operable data centers.

A method of providing high availability data is also provided according to another embodiment. The method includes associating a first application instance name with a first internet protocol address, the first application instance based on a first application and running in a first data center, and associating a second application instance name with a second internet protocol address. The second application instance is based on the first application and running in a second data center. The method also includes associating a client session with the first application instance name, receiving a first request for data from the client session, looking-up the first internet protocol address based on the first request and on the first application instance name, and sending the first request for data to the first internet protocol address. The method also includes associating, after the first data center fails, the first application instance name with the second internet protocol address. The method also includes receiving a second request for data from the client session, looking-up the second internet protocol address based on the second request and on the first application instance name, and sending the first request for data to the second internet protocol address.

In another embodiment, a load balancing data store system is also provided. The system includes a plurality of data centers, each data center comprises a data store and a plurality of applications, each application addressable by an internet protocol address and operable to access the data store. The system also includes a name service operable to resolve an application name to an internet protocol address, the name service further operable in response to a failure of one of the data centers resolve the name to an internet protocol address associated with one of the applications operable in a working data store. The system also comprises a load balancer operable to forward client requests to one of the applications in one of the data centers based on looking-up the internet protocol address based on the application name.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
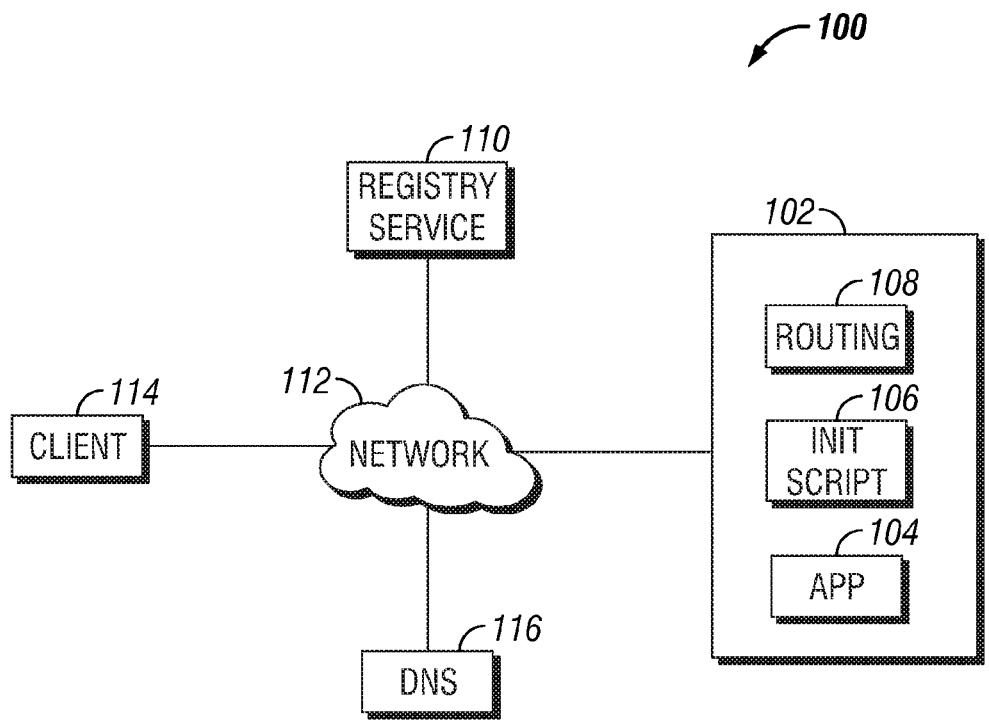
FIG. 1 is a block diagram of a system for routing communication to an application according to an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Engineering a network based on internet protocol (IP) addressing and routing is generally a manual and time consuming process. For example, redirecting client application requests from a large data center supporting 500 application programs to a vendor of on-demand-computing resources in the event of a catastrophe may require as much as 2,000 hours of engineering labor in provisioning and configuring IP addresses and injecting routes into the Internet.

A system for dynamic server addition using virtual routing is provided. The system dynamically provisions network addressing information and may reduce the time and labor costs associated with bringing up new computing resources, for example in the event of a catastrophe or to add additional resources as needed, for example, to respond timely to a promotion of a new product or special product offering. The system involves routing IP packets to an application, for example a server application, wherein the application is addressed by the IP address and a routing service located on the host computer whereon the application executes. If the application needs to be moved, restarted, or a new instance of the application is launched on a new computer, the application is assigned a new IP address associated with the new computer. The application's IP and/or routing information is automatically generated and updated to the relevant registry and domain name services. A registry service is contemplated to allocate IP addresses on demand from a pool of available IP addresses. The present disclosure also provides for the dynamic addition and reduction of server capacity as demand changes, without the need to perform time consuming engineering work to configure and promulgate IP addresses.

In an additional embodiment, a network centric application failover architecture is provided for automatically routing requests directed to, for example, a failed or troubled data center to alternate data centers. The architecture includes a load balancer to balance the load of requests coming into one or more data centers and a name service maintaining a listing of applications and IP addresses associated with those IP addresses. In the event of a failure of an application in a data center, the name service changes the association between the failed application name and IP address with that of a similar application operating at an alternate or back-up data center. For example, the naming service might change the IP address associated with the application name to the IP address of a similar application operating at the alternate data center.

Turning now to FIG. 1, a block diagram of a system 100 for implementing embodiments of the present disclosure is depicted. In an embodiment, a host computer 102, for example a server computer, supports an application instance 104, an initialization script 106, and a routing service 108. In an embodiment, when the application instance 104 boots or begins executing, the initialization script 106 executes and requests an IP address for the application instance 104 from a registry server 110, communicating with the registry server 110 through a network 112, for example the Internet. The registry service 110 associates the name of the application instance 104 with an IP address and stores this association or linkage for later reference. The registry service 110 returns the requested IP address to the initialization script 106 and marks the IP address as in use. The registry service 110 may maintain a pool of IP addresses that have been configured for the registry service 110 and may mark or otherwise designate the allocated IP addresses as used.

The initialization script 106 provides information linking the application instance 104 with the IP address to the routing service 108, whereby the routing service is informed to route IP packets designating the subject IP address to the application instance 104. In this manner, any request directed to the application instance 104 is matched and sent to the routing service 108. Upon receipt, the routing service 108, have a table of application instances 104 and corresponding IP addresses, routes the request to the appropriate application instance 104. Routing information is also provided to the network 112 to inform routers in the network 112 to route packets containing the subject IP address to the host computer 102. In an embodiment, the routing service 108, the initialization script 106, or the registry service 110 may provide the routing information to the network 112. In another embodiment, the functionality of the initialization script 106 described above is provided as part of the application instance 104, for example in a start-up function or object constructor method integral to the application instance 104. Thus the application instance 104 has its own IP address, which enables more flexibility, as will be discussed below, than when only the host computer 102 has an IP address.

A client 114, for example a client application executing on a desktop computer, sends a request for service or other communication addressed to the IP address of the application instance 104 over the network 112. The client 114 may be configured with the IP address of the application instance 104, or the client 114 may look-up the IP address of the application instance 104 based on a name of the application instance 104, for example using a name look-up service 116, for example a domain name service (DNS). The registry service 110 or the initialization script 106 may provide the name look-up service 116 with information linking the name of the application instance 104 to the IP address of the application instance 104. The DNS 116 may include a cross-reference from the application instance 104 IP address to the IP address of the routing service 108. The client 114 request is then directed sent to the routing service 108 on the host computer 102. Upon receipt, the routing service 108 directs the request to the appropriate application instance 104. In another embodiment, the functionality of the name look-up service 116 may be provided by the registry service 110. The application instance 104 may be one of many instances of an application that executes on a plurality of host computers 102. A different name and IP address is associated with each application instance 104.

While the above description of the system 100 is based on the example of a client-server model, one skilled in the art will readily appreciate that the system 100 may be used for other situations where a first application executing on a first computer communicates using the network 112 with a second application executing on a second computer.

Figure 2:
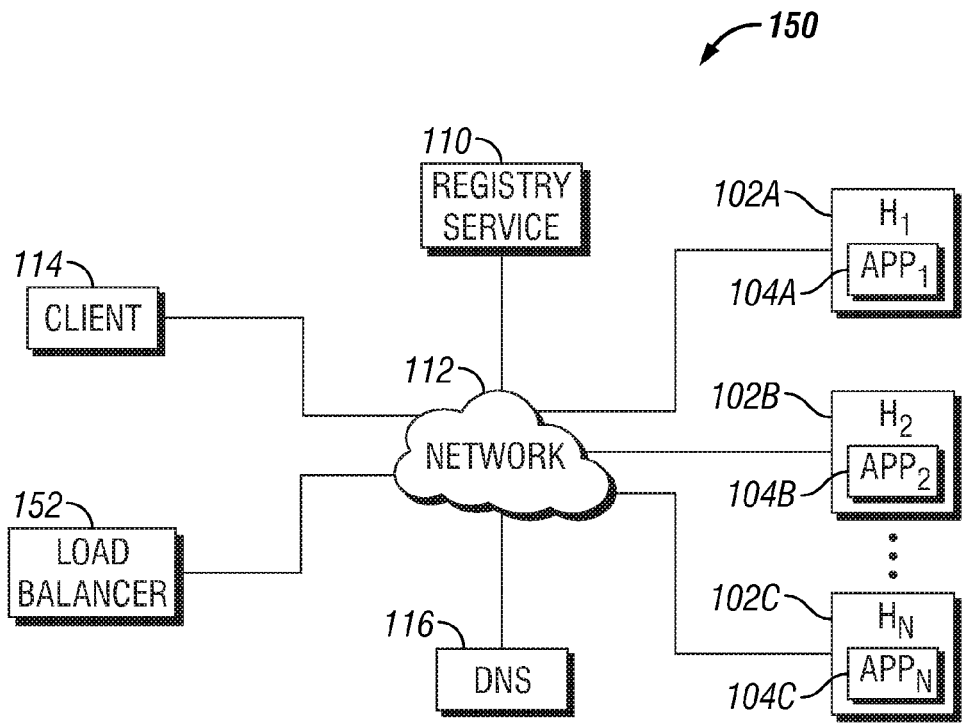
FIG. 2 is a block diagram of a system for dynamic server addition by routing communication to an application according to an embodiment of the present disclosure.

Turning now to FIG. 2, a system 150 according to another embodiment is depicted. The system 150 is substantially similar to system 100, with the difference that a plurality of host computers 102—for example a first host computer 102a, a second host computer 102b, and a third host computer 102c—are each running application instances 104—for example a first application instance 104a, a second application instance 104b, and a third application instance 104c. The application associated with the application instances 104 may, for example, be a customer record system which executes on more than one host computer 102 to provide the processing power needed to keep up with a large volume of requests from clients, for example where there are a plurality of the clients 114. Each application instance 104 may be an executing instance of the same or substantially the same image of the application. An additional difference between the system 100 and the system 150 is that the client 114 sends the request for service or other communication via the network 112 to a load balancer 152, and the load balancer 152 selects one of the several application instances 104 to which to forward the request, thereby to distribute the load among the application instances 104 appropriately.

The load balancer 152 may periodically request information from the registry service 110 about application instances 104, thereby learning of new application instances 104 that may have been brought up on additional host computers 102 to provide additional capacity. The information about the application instances 104 may include names of application instances 104. Alternatively, the registry service 110 may send update information, on the event of the initialization script 106 obtaining an IP address for a newly brought up application instance 104, to load balancers 152 that have registered with the registry service 110 to receive such information. When a load balancer 152 first registers with the registry service 110, the registry service 110 may provide a complete list of currently executing application instances 104.

Adding processing power to handle increasing client requests in the system 150 may involve little or no engineering time to configure IP addressing. An executable image of the application may be installed on the additional host computer 102, the initialization script 106, and the routing service 108 may be installed on the additional host computer 102. The executable image of the application may be booted starting a new application instance 104, and the initialization script 106 executes while or after the new application instance 104 boots. The executable image of the application, the initialization script 106, and the routing service 108 may be combined in a readily installed software package. As indicated above with reference to FIG. 1, in an embodiment, the functionality of the initialization script 106 may be integrated with the application instance 104, for example in a start-up routine or an object constructor method. It may be that a software installation package can be made available to a generic supplier of computing resources to be run on host computers 102 operated and maintained by the supplier, which may be termed vendor on-demand-computing. The on-demand-computing vendor starts the executable image of the application, and the client 114 may send requests to the application instances 104 via the load balancer 152. On-demand-computing may provide an efficient means to provide transient peak computing loads, for example to support sharply increased inquiries and/or account creation, such as following a mass media promotion of a new product offering. On-demand-computing may provide a useful means to continue to provide service to customers when an enterprise experiences a catastrophe, for example the destruction of a processing center by a fire or other accident.

Figure 3:
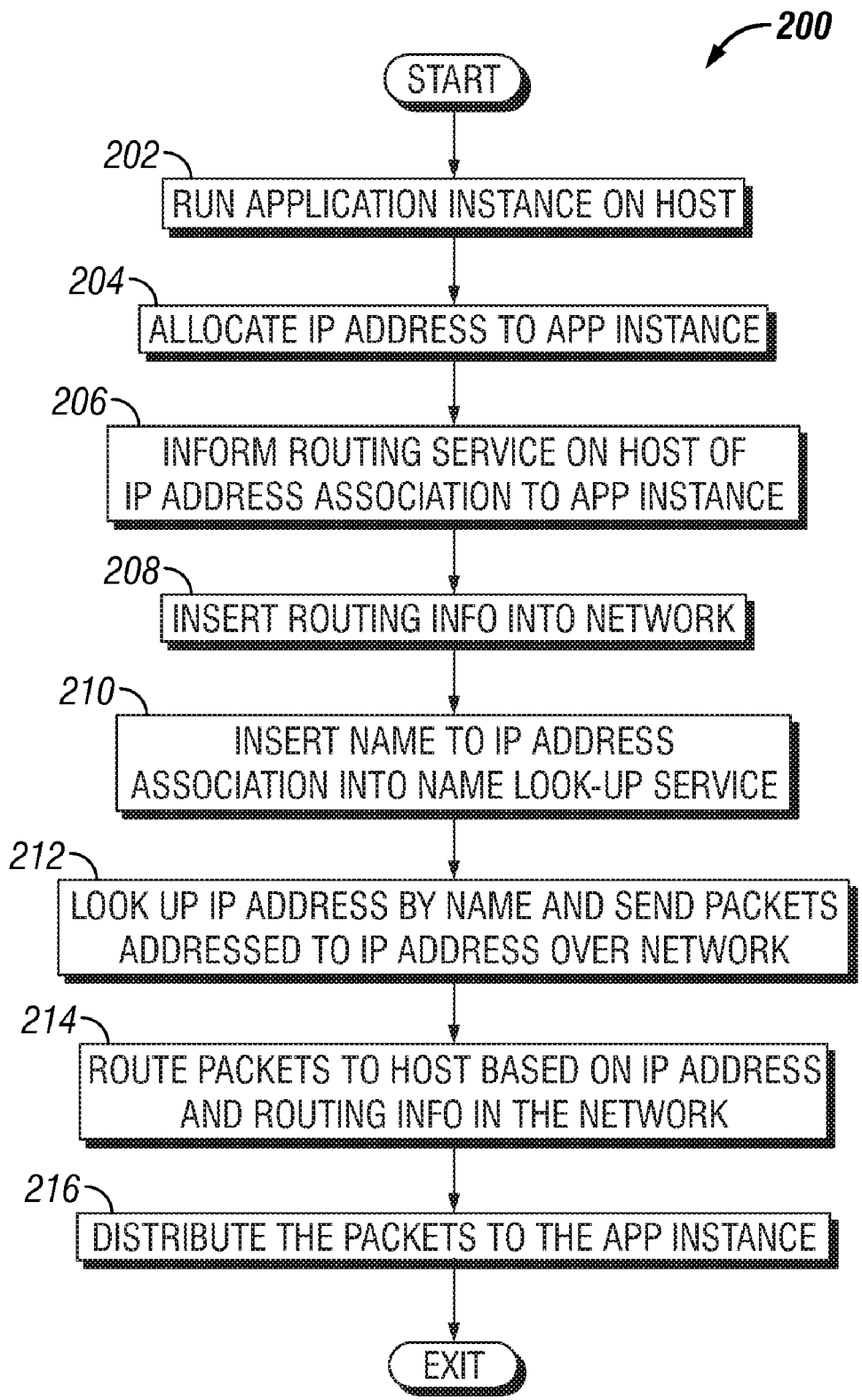
FIG. 3 is a logic flow diagram of a method for routing communication to an application according to an embodiment of the present disclosure.

Tuning now to FIG. 3, a logic flow diagram depicts a method 200 according to one embodiment of the present disclosure. In block 202, the application instance 104, for example the first application instance 104a, is brought into service or executed on the host computer 102, for example the first host computer 102a. The method proceeds to block 204 where an IP address is allocated for the application instance 104. The initialization script 106 may communicate with the registry service 110 to request the IP address to be allocated by the registry service 110 to the application instance 104. Alternatively, in another embodiment, a start-up routine or an object constructor method of the application instance 104 may communicate with the registry service 110 to request the IP address. The registry service 110 may mark the allocated IP address as in use or allocated and may store an association between the IP address and a name of the application instance 104.

The method proceeds to block 206 where the routing service 108 on the host computer 102 is notified of the association, linkage, or mapping between the IP address and the application instance. The routing service 108 uses the mapping between the IP address and the application instance 104 to route packets addressed to the IP address to the application instance 104. The method proceeds to block 208 where either the registry service 110 or the initialization script 106 insert routing information about the IP address into the network 112. The routing information may include, for example, an indication that the IP address of the host computer 102 is suitable to route traffic to the specified IP address of the application instance 104. The method proceeds to block 210 where a name of the application instance 104 is associated with the IP address in a name look-up service 116, for example a domain name service. In an alternative embodiment, the name to IP address association or mapping may be stored in the registry service 110 which provides name look-up services.

The method proceeds to block 212 where the IP address of the application instance 104 is looked up based on the name of the application instance 104, for example by a client 114 using the name look-up service 116. The IP address is then used to send packets to the application instance 104 using the network 112, for example such as the client 114 sending one or more request packets addressed to the IP address of the application instance 104 over the network 112. The method proceeds to block 214 where the packets are routed to the host computer 102 by the network 112, for example by routers in the network 112 whose routing tables direct that IP traffic to the IP address of the application instance 104 are to be sent to the host computer 102.

The method proceeds to block 216 where the packets are distributed to the application instance 104, for example by the routing service 108 located on the host computer 102. The application instance 104 processes the packets, for example generating a reply to a request and returning reply packets to the client 114 using the network 112. The method then exits.

Figure 4:
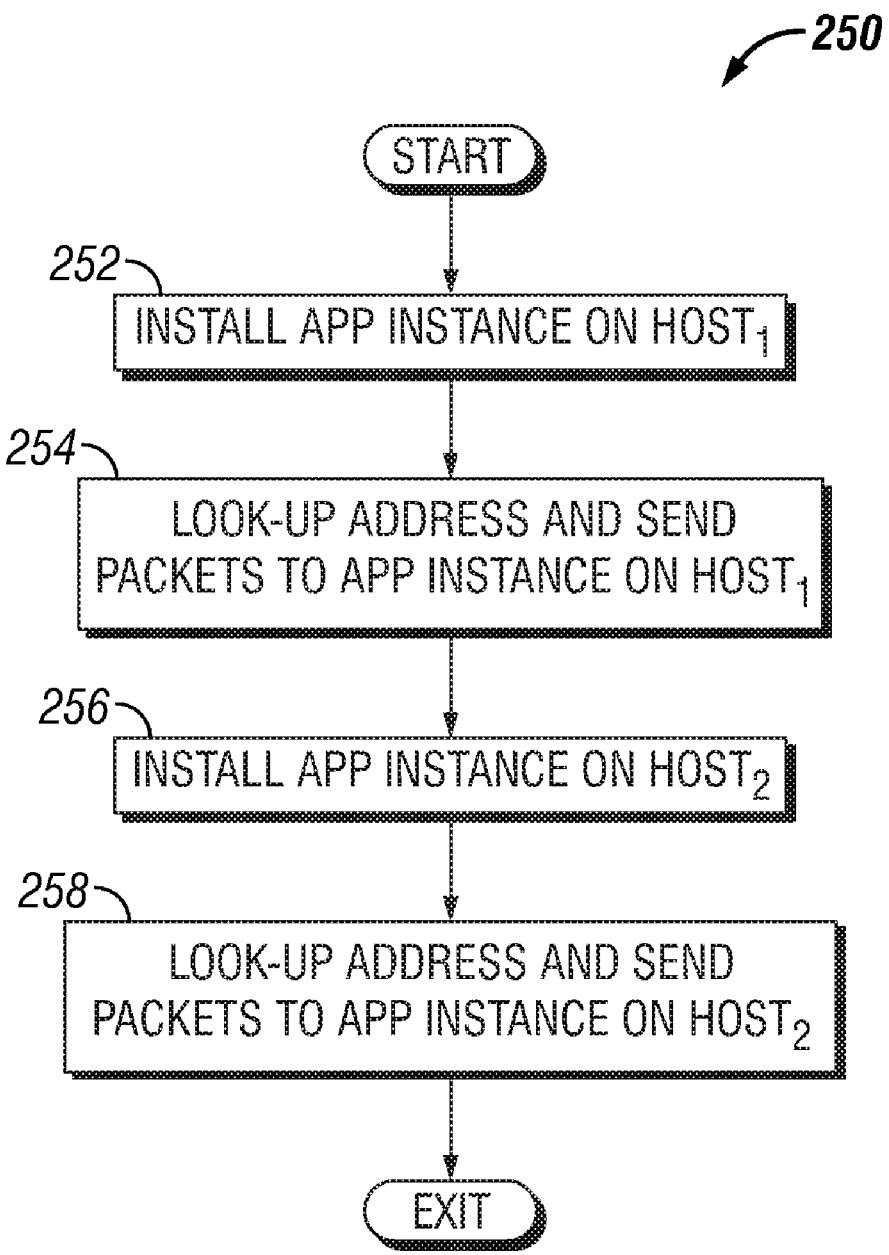
FIG. 4 is a logic flow diagram of a method for routing communication to an application on a dynamically added server according to an embodiment of the present disclosure.

Turning now to FIG. 4, a logic flow diagram depicts another method 250 according to an embodiment. In block 252 the application instance 104 is installed and is run on the host computer 102a. The processing in block 252 is substantially similar to the processing in blocks 202, 204, 206, 208, and 210 described above.

The method 250 proceeds to block 254 where the client 114 looks-up the IP address of the application instance 104 based on the name of the application instance 104, for example in a name look-up service 116. The client 114 then sends a request or other communication in one or more packets to the IP address using the network 112. The packets are routed to the application instance 104 by routers or other devices in the network 112 and by the routing service 108 in the host computer 102. The application instance 104 processes the packets and may return a reply to the client 114 using the network 112. The processing in block 254 is substantially similar to the processing in blocks 212, 214, and 216 described above.

The method 250 proceeds to block 256 where the application instance 104 is installed and is run on the second host computer 102b, a different host computer 102. Note that this scenario may correspond to replacing processing of client requests on an in-house host computer 102, for example a server computer, with processing of client requests on an outside host computer 102, for example in a on-demand-computing system provided by a vendor. Alternatively, the method 250 may correspond to replacing destroyed host computers 102, in the event of a disaster, by external host computers 102. Part of bringing the application instance 104 into service on the second host computer 102b may involve overwriting the entry in the name look-up service 116, for example a domain name service, with the same name but different IP address. The different IP address is associated with the different application instance 104 executing on the second host computer 102b.

The method 250 proceeds to block 258 where the client 114 looks-up the IP address of the application instance 104 based on the name of the application instance 104, for example in a name look-up service 116. The client 114 sends one or more packets to the IP address using the network 112, and the network 112 routes the packets to the application instance 104 now relocated to the different second host computer 102b. It is readily apparent that the present system may be employed in the event of a catastrophic or other failure, or other reasons to move applications or computers, to quickly and easily launch instances of application on other computers, perhaps in different geographic locations without needing to manually change routing tables, domain name servers, or other systems. The present system automatically updates the necessary routing and domain name tables and servers and is transparent to the client or requesting applications and systems.

Figure 5A:
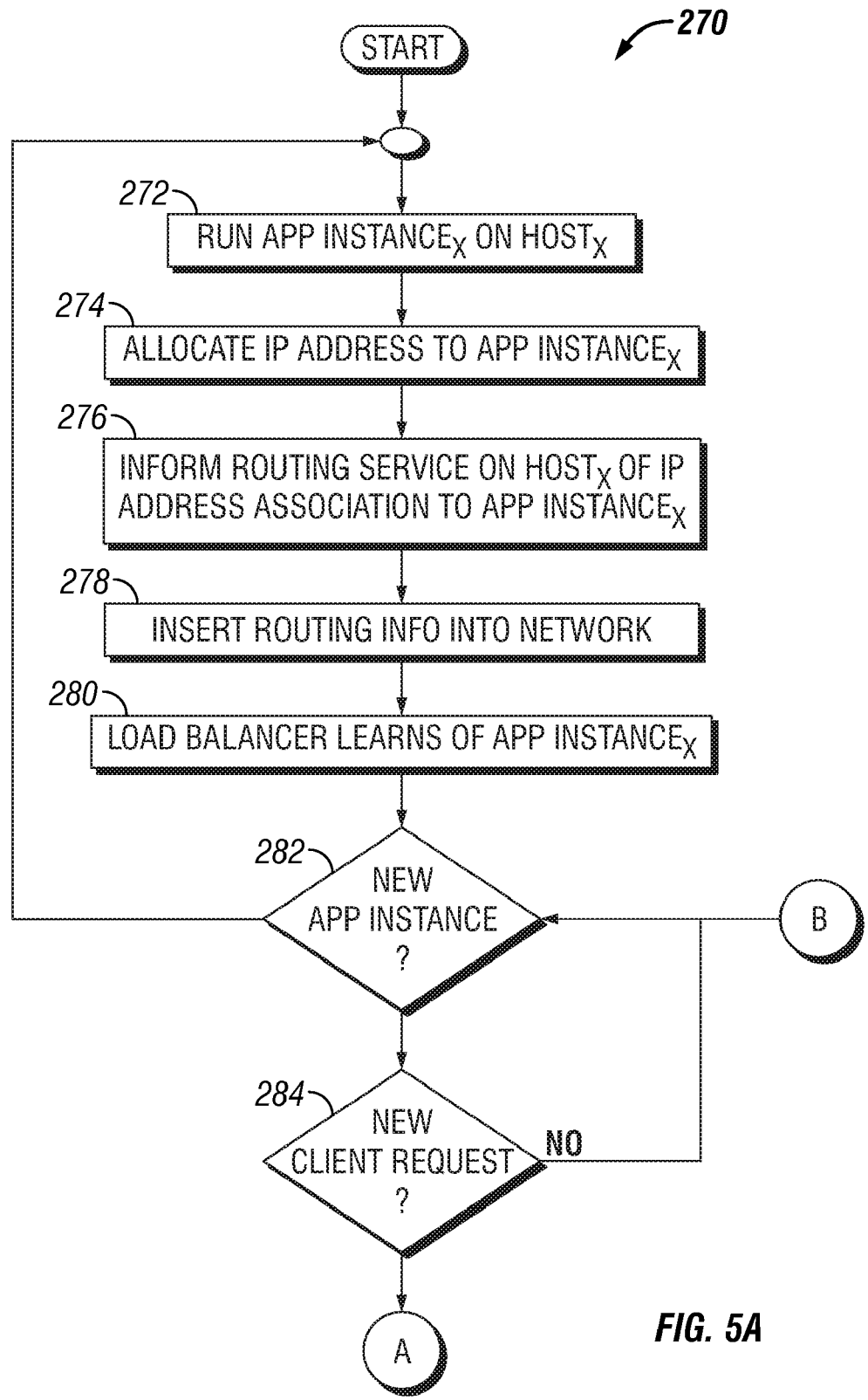
FIGS. 5A-5B illustrate load balancing according to an embodiment of the present disclosure.

Turning now to FIG. 5A, a first portion of a logic flow diagram of another method 270 according to an embodiment is depicted. The method 270 begins in block 272 where an application instance, for example the first application instance 104a, is brought into service on the host computer 102, for example the first host computer 102a. The processing of blocks 272, 274, 276, and 278 is substantially similar to the processing described above with reference to FIG. 3 for blocks 202, 204, 206, and 208. In block 280 the load balancer 152 obtains information about the existence or the specific application instance 104 brought into service in block 272. The load balancer 152 may periodically request updates of active application instances 104 from the registry service 110 or the registry service 110 may send out updates when the application instance 104 goes into service to entities, for example the load balancer 152, that register to receive such updates.

In an embodiment, when one application instance 104 is shut down, the registry service 110 is notified by the host computer 102, for example by the application instance 104 executing a termination routine, that the application instance 104 is going out of service. The registry service 110 may send a notice to registered load balancers 152 and/or to other registered entities of the retirement of the application instance 104. The registry service 110 may communicate with the name look-up service 116 to remove information associating the name of the application instance 104 with an IP address.

The method 270 proceeds to block 282 where if a new application instance 104, for example the second application instance 104b, comes into service, the method 270 returns to block 272. In an embodiment, many application instances 104 of a single application executable image may be running in a plurality of host computers 102 to provide sufficient processing capability to serve a large number of clients 114. In block 282 if no new application instance 104 has come into service, the method 270 proceeds to block 284. In block 284, if a new client request is directed to the load balancer 152, the method proceeds to block A on FIG. 5B.

Figure 5B:
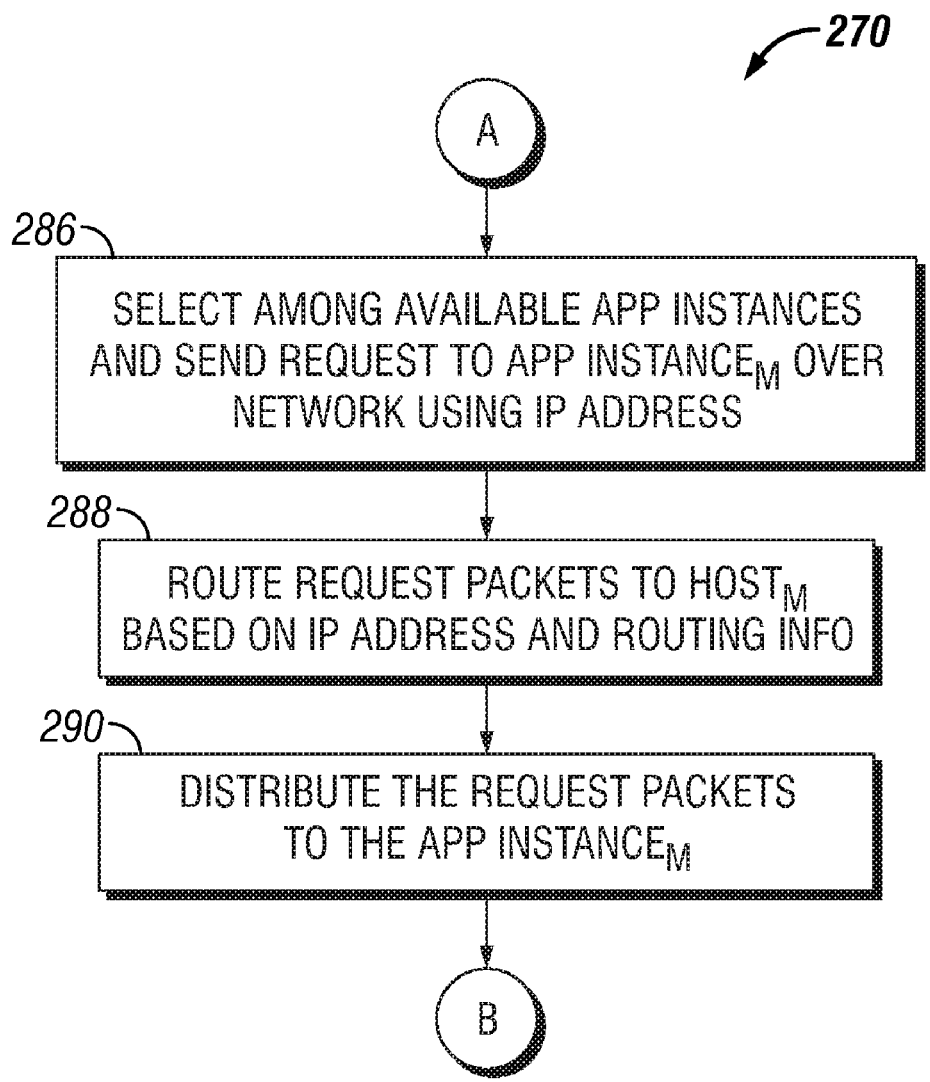

Turning now to FIG. 5B, a second portion of the logic flow diagram of the method 270 is depicted. The method 270 resumes in block 286 where the load balancer 152 selects among the available application instances 104 and sends the new client request to the selected application instance 104, for example the second application instance 104b. The load balancer 152 may look up the IP address of the selected application instance 104 based on the name of the application instance 104, for example using the name look-up service 116. Alternatively, the load balancer 152 may store the IP address of each application instance 104 as the load balancer 152 learns that the application instance 104 has come into service and reference this stored information.

The method 270 proceeds to block 288 where the packets encapsulating the new client request are routed by the network 112 to the selected application instance 104 based on the IP address in the packets and on the routing information. The method 270 proceeds to block 290 where the packets are distributed to the selected application instance 104 for processing. The method 270 then returns to block 282.

The method 270 provides for the dynamic addition and reduction of server capacity as demand changes, without the need to perform time consuming engineering work to configure and promulgate IP addresses. The method 270 may be used to run a first application on one or more host computers 102 during a first portion of a day, for example during business hours, and to run a second application on the host computers 102 during a second portion of the day, for example during night-time hours. This may increase the efficiency of computer systems by reducing the number of host computers 102 needed to support the processing needs of an enterprise.

Figure 6:
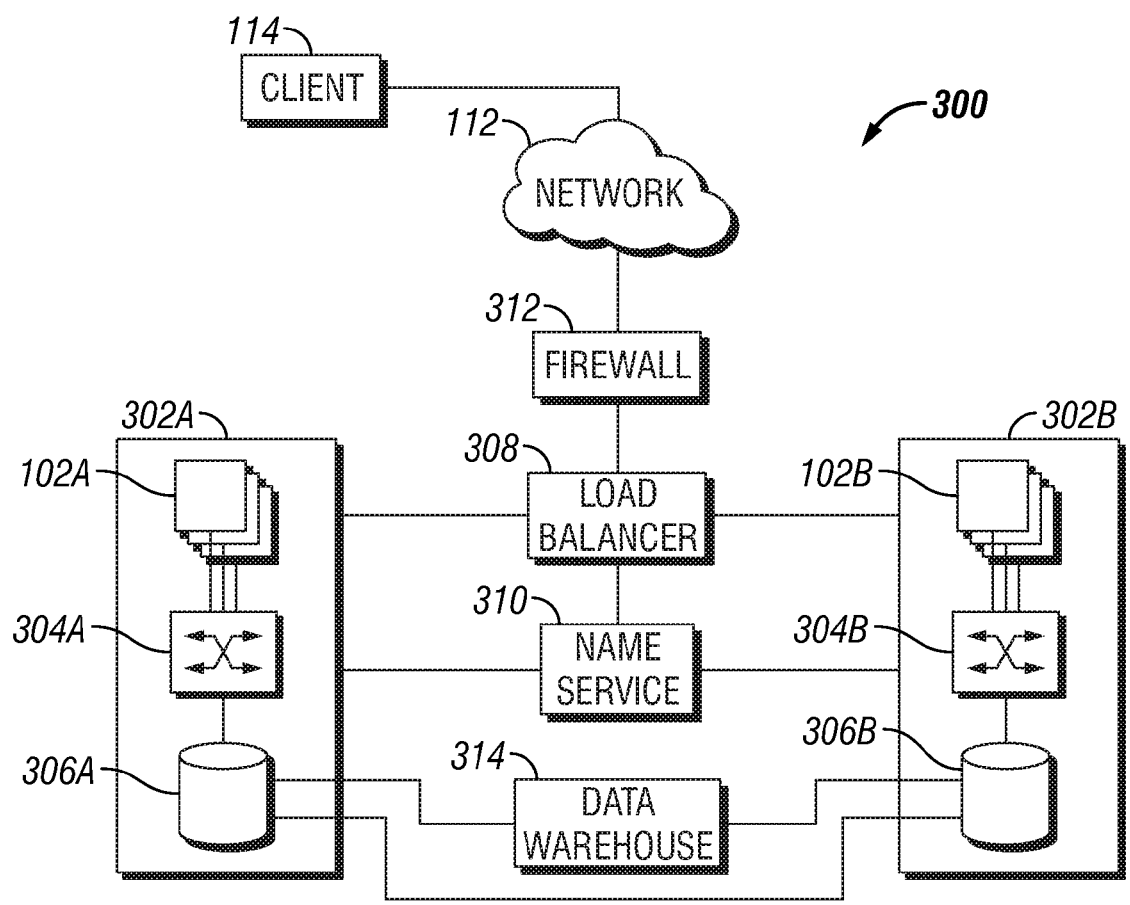
FIG. 6 is a block diagram of a high availability data storage system according to an embodiment of the present disclosure.

Turning now to FIG. 6, a block diagram depicts a system 300 which provides high availability for at least some of the data stored in data centers 302—a first data center 302a and a second data center 302b. In an embodiment, the data centers 302 comprise a plurality of host computers 102, an optional switch director 304, and a data store 306. The host computers 102 execute the application instances 104 that provide access to data stored in the data store 306. In an embodiment, the switch director 304 mediates access from the host computers 102 to the data store 306, but in another embodiment the host computers 102 may access the data store 306 without mediation. While two data centers 302a and 302b are shown in FIG. 6, in another embodiment additional data centers 302 may be provided that may or may not be geographically disparate.

A load balancer 308 distributes requests from a plurality of clients (not shown) to the application instances 104 operating on the host computers 102 to balance the processing load on the host computers 102 in the data centers. In one embodiment, the load balancer 308 establishes a session associated with the client 114. While the session is active, the load balancer 308 routes all requests from the client 114 to the same IP address associated with the application instance 104. The load balancer 308 looks-up the IP address based on the name of the application instance 104 using a data center name service 310. The data center name service 310 establishes an association between the name of one application instance 104 and the IP address of the application instance 104.

Additionally, the data center name service 310 monitors the status of the data centers 302. If the data accessed by the first application instance 104a is mission critical data and if the data center 302 where the first application instance 104a executes fails, the data center name service 310 changes the association between the name of the first application instance 104a operating on computer host 102a and the IP address of the application instance to the IP address of a second application instance 104b operating on computer host 102b that executes in a different data center 302b. Both the first application instance 104a and the second application instance 104b are instances of substantially the same application image or program. In this manner, requests from client 114 are quickly rerouted to data applications 102b in data center 302b in the event of a failure in data center 302a.

Mission critical data may be identified as data whose integrity and continuous access is necessary to some level of operation at the enterprise. In an embodiment, data may be identified as mission critical, business critical, enhanced standard, and standard. When one of the data centers 302 fail, the client requests for mission critical data are automatically routed by the load balancer 308 to the application instance 104 executing in an active data center 302 because the IP address the load balancer 308 looks-up is different.

In an embodiment, an internet firewall 312 is placed between the network 112 and the load balancer 308 to protect the system 300 from security threats. Some of the data in the data stores 306 is synchronized or replicated between the data centers 302. In an embodiment, data deemed mission critical is replicated between the data stores 306. Replication of data may be provided by tools and systems provided by vendors. In an embodiment, a data warehouse 314 provides long term storage of data. Data in the data centers 302 that has been idle for a threshold period of time may be transferred automatically to the data warehouse 314 to free data storage for use by other application instances 104. In an embodiment, idle data may be transferred after thirty days, forty-five days, or sixty days. In other embodiments, different time thresholds may be employed to trigger automatic data transfer to the online data warehouse 314. Data may be transferred at different time thresholds based on the category or classification of the data.

Figure 7B:
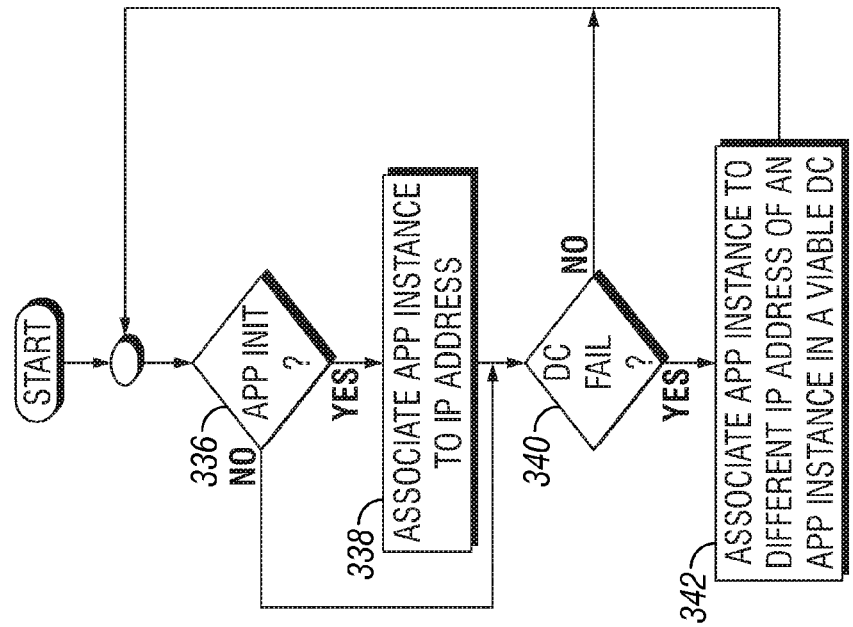
FIGS. 7A-7B illustrate redirecting client requests for data from a failed data storage system to an alternate data storage system according to an embodiment of the present disclosure.
Figure 7A:
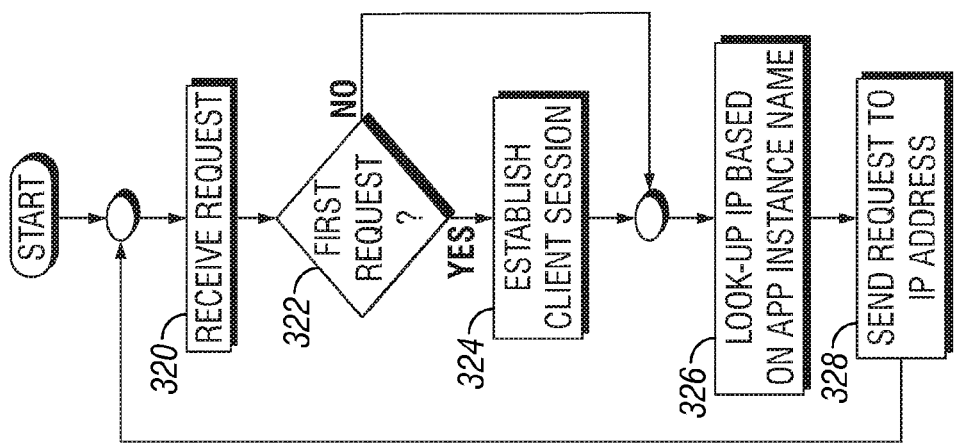

Turning now to FIG. 7A, a method for the load balancer 308 to forward requests from the client 114 is depicted. The method begins in block 320 where the load balancer 308 receives a request, for example from the client 114, to access data. The method proceeds to block 322 where if the request is the first from the client 114 for some time, the method proceeds to block 324 where a session between the client 114 and the load balancer 308 is established. A session may be terminated by a message sent by the client 114 to the load balancer 308, or the load balancer 308 may terminate the session based on a period of time passing during which no communication is received from the client 114. The method proceeds to block 326 where the load balancer 308 looks-up the IP address of the application instance 104 based on the name of the application instance. In an embodiment, the load balancer 308 communicates with the name service 310 to look-up the IP address, but in another embodiment, the load balancer 308 may keep a table mapping application names to IP addresses. The method proceeds to block 328 where the load balancer 308 sends the request to the IP address that was looked-up in block 326.

Turning now to FIG. 7B, a method for initializing and maintaining associations or mapping between the names of application instances and IP addresses is depicted. The method begins in block 336 where if an application instance 104 is being initialized, the method proceeds to block 338 where an available IP address is associated or mapped to the name of the application instance. Along with the name to IP address mapping, the identity of the data center 302 that the application instance executes in is retained. The method proceeds to block 340 where if a data center has failed, the method proceeds to block 342. In block 342, for each application instance 104 that had been executing in the failed data center 302, the name of the application instance is associated with the IP address of a coordinate or similar application instance executing in one of the remaining viable data centers 302. Because of this dynamic remapping of IP addresses to the names of application instances 104 in the failed data center 302, the requests from the client 114 otherwise bound for the failed data center 302 are automatically directed by the load balancer 308, because of the name based look-up of the IP address, to the application instance 104 located in the viable data center 302.

Figure 8:
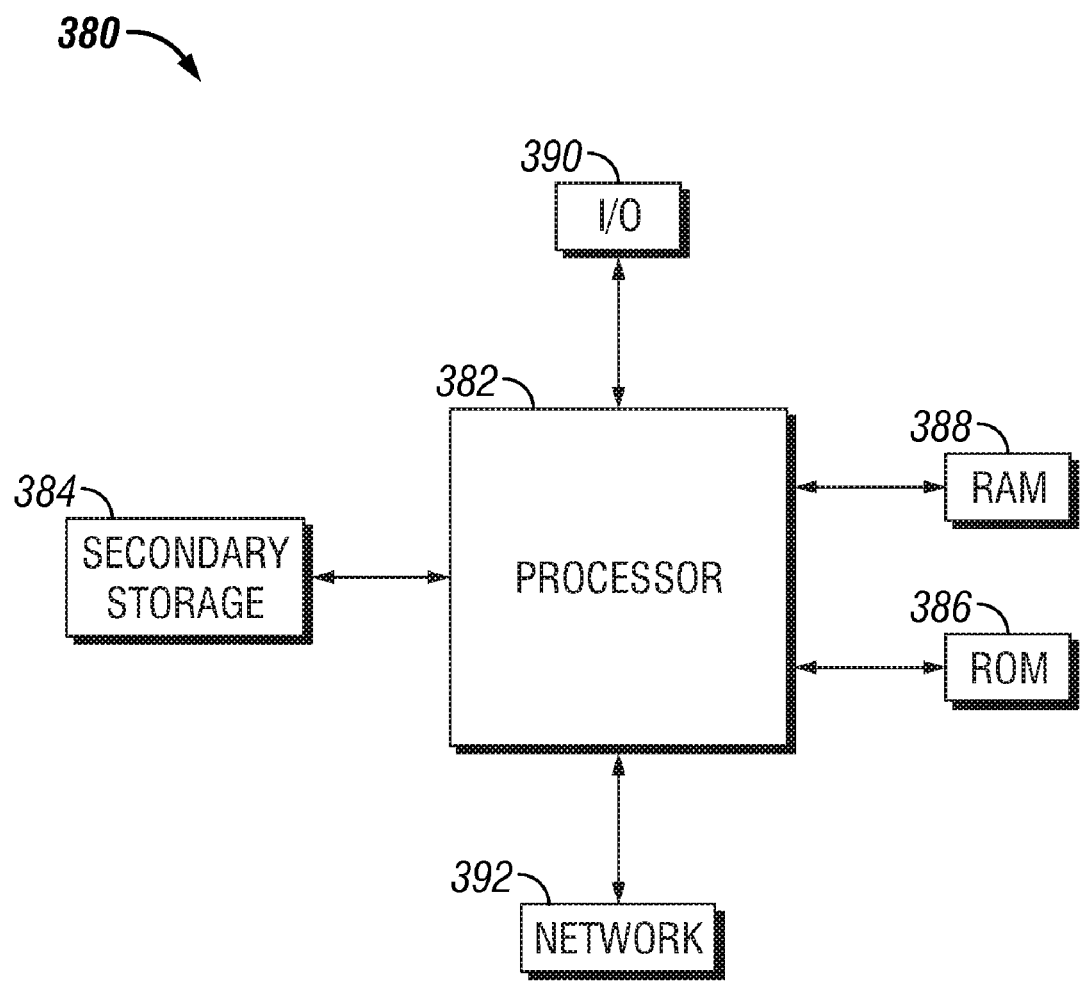
FIG. 8 illustrates an exemplary general purpose computer system suitable for implementing the several embodiments of the disclosure.

The systems 100, 150, and 300 described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A high availability data store system, comprising:
   two or more data centers, each data center comprising:
   a data store;
   a plurality of host computers; and
   a plurality of application instances executing on the host computers, the applications operable to access the data store in response to a client request, wherein each host computer is operable to route client requests to the one or more application instances executing on the host computer based on an internet protocol address associated with each application instance;
   a load balancer operable to establish a session with a client, wherein the session is associated with a first application instance based on a first internet protocol address of the first application instance, the load balancer further operable to receive a plurality of client requests and to send the client requests to the first application instance using the first internet protocol address; and
   a name service associating the session with the first internet protocol address, wherein the load balancer looks-up the first internet protocol address using a name of the session, the name service operable, when the data center associated with the first application instance fails, to change the association of the session with the first internet protocol address to associate the session with a second internet protocol address that routes to a second application instance executing on a host computer in one of the data centers which is operable.

2. The system of claim 1 wherein at least some of the data stored in the data store is synchronized between the data stores of the data centers.

3. The system of claim 2 wherein mission critical data stored in the data store is synchronized between the data stores of the data centers.

4. The system of claim 2 wherein the data centers are geographically remote from each other.

5. The system of claim 1 wherein the data centers are geographically remote from each other.

6. The system of claim 1 further including an online data warehouse in communication with the data centers that provides long term data storage.

7. The system of claim 6 wherein data is transferred from the data centers to the online data warehouse after the data has been idle for a period of time selected from the group consisting of thirty days, forty five days, and sixty days.

8. A method of providing high availability data, comprising:
   associating a first application instance name with a first internet protocol address, the first application instance based on a first application and running in a first data center;
   associating a second application instance name with a second internet protocol address, the second application instance based on the first application and running in a second data center;
   associating a client session with the first application instance name;
   receiving a first request for data from the client session;
   looking-up the first internet protocol address based on the first request and on the first application instance name;
   sending the first request for data to the first internet protocol address;
   associating, after the first data center fails, the first application instance name with the second internet protocol address;
   receiving a second request for data from the client session;
   looking-up the second internet protocol address based on the second request and on the first application instance name; and
   sending the second request for data to the second internet protocol address.

9. The method of claim 8 wherein the first and second data centers are geographically remote from each other.

10. The method of claim 8 further including monitoring the first and second data centers for failure.

11. The method of claim 8 further including transferring data from the first data center and from the second data center to an online data warehouse after the data has been idle for a threshold period of time.

12. The method of claim 11 wherein the threshold period of time is selected from the group consisting of thirty days, forty-five days, and sixty days.

13. The method of claim 8 wherein the first application instance executes on a first host computer in the first data center and further including routing requests sent to the first internet protocol address to the first application instance, the routing performed by a first routing service running on the first host computer and wherein the second application instance executes on a second host computer in the second data center and further including routing the requests sent to the second internet protocol address to the second application instance, the routing performed by a second routing service running on the second host computer.

14. The method of claim 8 further including synchronizing at least some of the data between the first and second data center.

15. A load balancing data store system, comprising:
- a plurality of data centers, each data center comprising:
  - a data store; and
  - a plurality of applications, each application addressable by an internet protocol address and operable to access the data store;
- a name service operable to resolve an application name to an internet protocol address, the name service further operable in response to a failure of one of the data centers resolve the name to an internet protocol address associated with one of the applications operable in a working data store; and
- a load balancer operable to forward client requests to one of the applications in one of the data centers based on looking-up the internet protocol address based on the application name.

16. The system of claim 15 wherein mission critical data stored in the data store is synchronized between the data stores of the data centers and wherein the data centers are geographically remote from each other.

17. The system of claim 15 wherein at least some of the data in the data store of each data center is synchronized between the data centers.

18. The system of claim 15 wherein each data center further comprises one or more host computers, the applications execute on the host computers, and a routing service on each host computer routes requests to the applications based on an internet protocol address associated with the applications.

19. The system of claim 15 further including an online data warehouse that provides long term storage to which data is transferred from the data centers when the data has remained idle for a threshold period of time.

20. The system of claim 19 wherein the period of time is selected from the group consisting of thirty days, forty-five days, and sixty days.

* * * * *